United States Patent
Bellon

(10) Patent No.: US 6,775,686 B1
(45) Date of Patent: Aug. 10, 2004

(54) HIGH AVAILABILITY REDUNDANT ARRAY OF DATA STORAGE ELEMENTS THAT BRIDGES COHERENCY TRAFFIC

(75) Inventor: Mark Bellon, Phoenix, AZ (US)

(73) Assignee: Motorola, Inc., Schaumburg, IL (US)

( * ) Notice: Subject to any disclaimer, the term of this patent is extended or adjusted under 35 U.S.C. 154(b) by 841 days.

(21) Appl. No.: 09/651,192

(22) Filed: Aug. 30, 2000

(51) Int. Cl.[7] .............................................. G06F 15/16
(52) U.S. Cl. ...................... 709/201; 709/213; 709/217; 709/218; 711/100; 711/168
(58) Field of Search ................................. 709/201, 213, 709/217, 218; 711/100, 168

(56) References Cited

U.S. PATENT DOCUMENTS

| | | | | |
|---|---|---|---|---|
| 5,832,222 A | * | 11/1998 | Dziadosz et al. ............ | 709/216 |
| 5,991,891 A | | 11/1999 | Hahn et al. .................... | 714/4 |
| 6,073,218 A | * | 6/2000 | DeKoning et al. ........... | 711/150 |
| 6,192,408 B1 | * | 2/2001 | Vahalia et al. ............... | 709/229 |
| 6,263,405 B1 | * | 7/2001 | Irie et al. ..................... | 711/141 |
| 6,330,591 B1 | * | 12/2001 | Ducaroir et al. ............ | 709/213 |
| 6,442,551 B1 | * | 8/2002 | Ofek ............................. | 707/10 |
| 6,654,752 B2 | * | 11/2003 | Ofek ............................. | 707/10 |

\* cited by examiner

*Primary Examiner*—Saleh Najjar
(74) *Attorney, Agent, or Firm*—Jeff D. Limon; Kevin D. Wille

(57) ABSTRACT

In a high availability redundant array of data storage elements, one of a plurality of storage element controllers (FIG. 1, 110, 120) is interfaced to a corresponding network (150, 160). Each of the plurality of storage element controllers (110, 120) receives and transmits mass storage traffic to and from a plurality of processing elements (130, 140) coupled to each network (150, 160). The storage element controllers (110, 120) also transmit and receive coherency traffic among each other in order to ensure that individual file management and manipulation operations, as initiated by each processing element (130, 140) within a network (150, 160), are carried out by the storage element controllers (110, 120) within the storage elements (100).

18 Claims, 2 Drawing Sheets

US 6,775,686 B1

HIGH AVAILABILITY REDUNDANT ARRAY OF DATA STORAGE ELEMENTS THAT BRIDGES COHERENCY TRAFFIC

FIELD OF THE INVENTION

The invention relates to computer data storage and, more particularly, to redundant arrays of data storage elements used in high availability systems.

BACKGROUND OF THE INVENTION

In a high availability distributed data communications system where multiple processing elements are interacting with a redundant array of data storage elements, read/write access to the data storage elements must be controlled and coordinated among the processing elements. Without such control and coordination, the operations of the data storage elements could constantly be redirected by any one of the processing elements prior to the completion of an operation. The resulting system would not only corrupt the data stored on the redundant array of data storage elements, but would additionally render the entire distributed communications system useless.

In order to manage and coordinate the read/write traffic to and from the data storage elements, coherency communications traffic is conveyed among the processing elements of the communications system. This coherency traffic functions to manage and synchronize access to the data storage elements to ensure that individual read and write operations are completed in a timely and efficient manner and are allowed to run to completion prior initiating the next operation. Further, the use of coherency traffic precludes the corruption of the data on the data storage entity caused by contention over control of the storage entity.

In a typical distributed data communications system, the coherency traffic is managed by the processing elements which interact with the data storage elements. This usually necessitates a dedicated communications channel which conveys coherency traffic among the processing elements. This channel is also used to enable each of the multiple processing elements of the communication system to signal each other in order to determine which element is granted access to the data storage entity at any particular time.

However, when there is significant distance between the constituent processing elements of the distributed data communications system, the channel used to convey coherency traffic must operate over this distance, and must manage any latency inherent in the communications channel. Further, when the processing elements of the data communication system are spread among multiple networks, the management of coherency traffic becomes increasingly complex. Thus, it is highly desirable for the communications network to employ a redundant array of data storage elements that bridges coherency traffic across multiple networks.

BRIEF DESCRIPTION OF THE DRAWINGS

The invention is pointed out with particularity in the appended claims. However, a more complete understanding of the invention may be derived by reading the specification herein in conjunction with the figures wherein like reference numbers refer to like components, and:

DESCRIPTION OF THE PREFERRED EMBODIMENTS

A redundant array of data storage elements that bridges coherency traffic across multiple networks provides an improved means of controlling access to the data storage elements in a high availability communications system. This allows the processing elements to perform file operations and manipulate the data stored in a redundant array of data storage elements without requiring a separate communications channel to convey coherency traffic information. The resulting system reduces the required complexity of high availability redundant arrays of data storage elements, and is especially useful when processing elements spread across multiple networks are required to perform file access operations using the data storage elements. The system additionally provides the opportunity for increasing the performance of a redundant array of data storage elements without jeopardizing the fault tolerant aspects of the redundant array.

Figure 1:
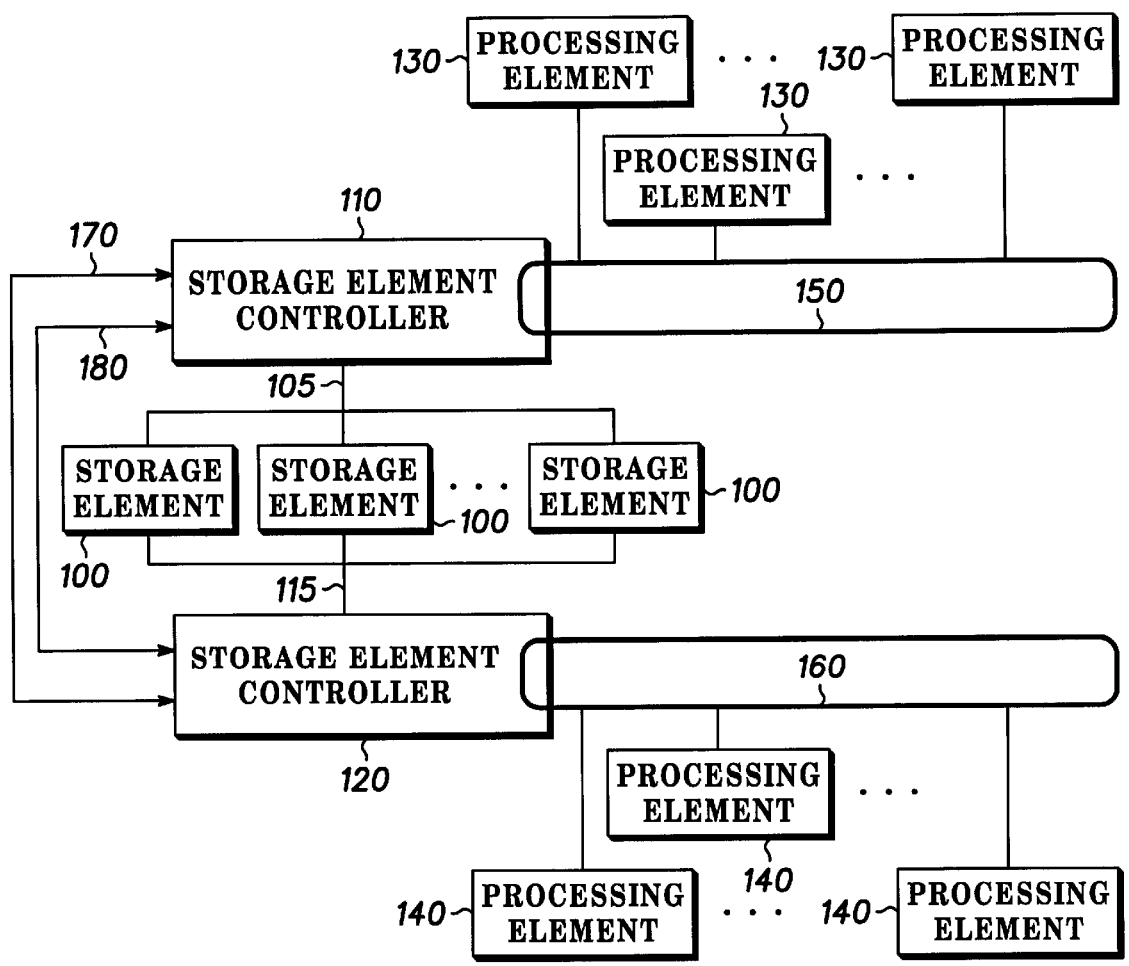
FIG. 1 is a block diagram of a high availability redundant array of data storage elements that bridges coherency traffic across multiple networks in accordance with a preferred embodiment of the invention.

FIG. 1 is a block diagram of a high availability redundant array of data storage elements that bridges coherency traffic across multiple networks in accordance with a preferred embodiment of the invention. In FIG. 1, storage elements 100 are representative of any type of computer storage entity such as those used in conventional redundant arrays of inexpensive disks. Thus, storage elements 100 can be representative of computer disks which employ a magnetic medium to store information, or can be representative of computer disks which employ a digital storage media which is read by way of a laser.

Storage element controllers 110 and 120 perform low-level access functions which enable processing elements 130 and 140 to perform file access operations using one or more of storage elements 100. In the system of FIG. 1, processing elements 130 communicate directly with storage element controller 110. Similarly, processing elements 140 communicate directly with storage element controller 120. Additionally link 105 provides the channel by which traffic is passed between storage element controller 110 and storage elements 100, while link 115 provides the channel by which traffic is passed between storage element controller 120 and storage elements 100.

Through the aforementioned arrangement, when one of processing elements 130 requires read access to storage elements 100, the information read from storage elements 100 is formatted by storage element controller 110, thus allowing the resulting mass storage traffic to be conveyed across network 150 to the particular processing element. In a similar manner, when one of processing elements 130 requires access to storage elements 100 in order to store data, the mass storage traffic is conveyed along network 150 to storage element controller 110 and on to storage element 100. Although FIG. 1 shows networks 150 and 160 having processing elements 130 and 140 arranged in a ring or a loop, nothing prevents the arrangement of the processing elements in accordance with any other network technology such as a bus or a star network. Further, nothing precludes the use of copper-based or optical media (such as optical fibers) as the transmission channel used for networks 150 and 160.

In a preferred embodiment, processing elements 130 and 140 also convey coherency traffic along networks 150 and 160, respectively. Additionally, all coherency traffic from one of processing elements 130 is received by the remainder of processing elements 130. In this manner, each of processing elements 130 is continuously made aware of all coherency traffic present on network 150. In a similar manner, each of processing elements 140 is continuously made aware of all coherency traffic present on network 150.

In addition to processing elements 130 being apprised of coherency traffic present on network 150, processing elements 130 are additionally apprised of the coherency traffic present on network 160 by way of a bridging function performed by storage element controllers 120 and 110 and link 170. Therefore, in the event that one of processing elements 140 has requested access to files from storage elements 100 by way of storage element controller 120, this request can be made available through link 170 between storage element controller 120 and storage element controller 110. Through this communication, each of processing elements 130 can be alerted of the fact that storage elements 100 are unavailable until storage element 100 complete the read operation. Similarly, when one of processing elements 130 has requested access to storage elements 100 through storage element controller 110, this information is conveyed through link 170 to storage element controller 120 in order to preclude processing elements 140 from accessing storage elements 100 until this operation is complete.

Also coupled between storage element controllers 110 and 120 is link 180. Link 180 preferably functions to convey semaphore traffic and other signaling messages that enable storage element controllers 110 and 120 to share access to storage elements 100. This traffic includes cache and command coherency traffic in accordance with conventional techniques. Although shown as separate from link 170 in FIG. 2, nothing prevents the integration of the functions performed by link 180 into link 170. Thus, link 170 and 180 can be visualized as separate logical links only, rather than strictly requiring each to be separate physical links.

Through the transmission of coherency traffic along link 170, each of processing elements 130 and 140 are made aware of their ability to access storage elements 100 at any particular time. Furthermore, through the use of a storage element access protocol, such as is described in relation to FIG. 2, a failure of a particular processing element, or a failure of one or more of storage element controllers 110 and 120, will not affect the access to the storage element required by a processing element interfaced to the remaining storage element controller.

Figure 2:
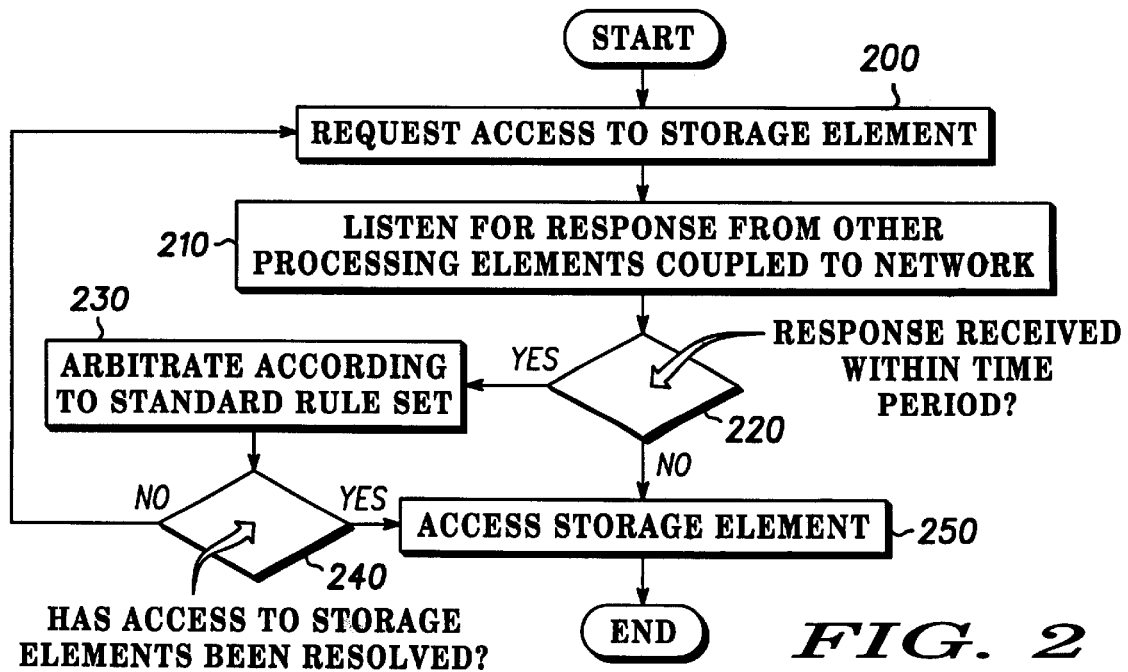
FIG. 2 is a block diagram of a controller in a high availability redundant array of data storage elements that bridges coherency traffic across multiple networks in accordance with a preferred embodiment of the invention.

FIG. 2 is a flowchart for a method used by a processing element in a high availability redundant array of data storage elements that bridges coherency traffic along multiple networks in accordance with a preferred embodiment of the invention. The system of FIG. 1 is suitable for performing the method. The method of FIG. 2 is intended to be illustrative of a candidate technique used by a processing element in a high availability redundant array of data storage elements that bridges coherency traffic. Thus, the inclusion of FIG. 2, and the related description herein are not intended to limit the invention in any way.

The method begins at step 200 where a particular processing element initiates coherency traffic such as a request for access to a storage element. This access can be any type of read or write transaction which requires the momentary exclusive control over the storage elements. Step 200 also includes the detecting of the request and the forwarding of that request to other processing elements interfaced to adjacent networks that share storage elements 100 by way of storage element controllers such as storage element controllers 110 and 120 of FIG. 1. At step 210, the processing element waits for a response from any other processing element coupled to the network. At step 220, the processing element determines if a response has been received from another processing element coupled to the network.

In step 220, the response can come from a processing element currently interfaced to the same network as the processing element which initiated the request at step 200. Additionally, the response can come from an adjacent network wherein the response has been forwarded from a storage element controller which manages the coherency traffic of the adjacent network. In a preferred embodiment, this response is brought about by way of a bridging function which distributes coherency traffic between networks, such as a system similar in function to FIG. 1.

In the event that a response has been received within a given time period, the method continues at step 230 where the concerned processing elements arbitrate access to the storage elements according to a standard rule set. It is anticipated that the standard rule set is in accordance with the exchange of arbitration and contention resolution techniques for managing coherency traffic known to those of skill in the art. These techniques may include, distributed locking algorithms, priority and fairness-based techniques and latency minimization. At step 240, the processing element determines if access to the storage elements has been resolved within a given time period. In the event that access to the storage elements has not been resolved, the method reverts to step 200, where the processing element initiates a second request.

It is noteworthy that step 240 accounts for the condition of a processing element or an associated storage element controller failing during the arbitration process of step 230. Either failure event is characterized by the step 230 not being completed within a particular time period. Thus, from the perspective of the operation of the individual processing elements, the steps required to reinitiate access to the storage elements is identical. This allows common software within each processing element to be used for either failure type.

If the result of step 220 indicates that no response was received, step 250 is executed wherein the processing element accesses the storage element as needed. Step 250 also results from the successful and timely resolution of arbitration step 230.

As previously mentioned, the method of FIG. 2 is illustrative of a candidate method used by a processing element in a high availability redundant array of data storage elements that bridges coherency traffic. Alternative methods may be used in place of FIG. 2 so long as the selected method accords with the principles of FIG. 2 in that there is no assumption that individual processing cannot fail during arbitration, each processing element suitably cooperates during the arbitration process, and that each element cooperates in a substantially identical manner.

Figure 3:
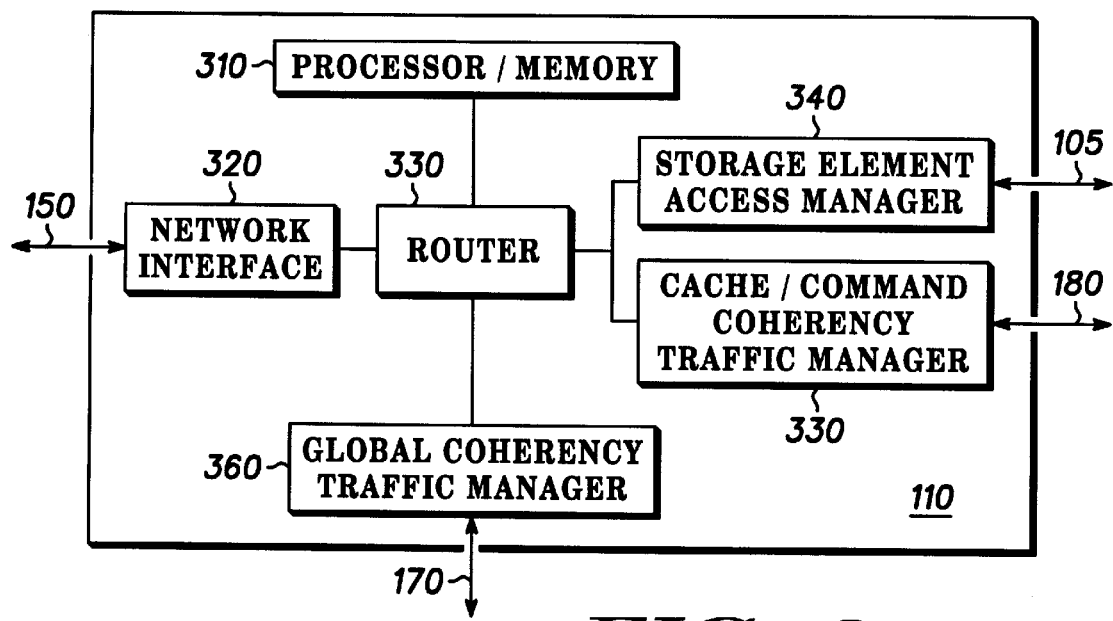
FIG. 3 is a block diagram of a storage element controller that bridges coherency traffic across multiple networks in accordance with a preferred embodiment of the invention.

FIG. 3 is a block diagram of a storage element controller (110 of FIG. 1) that bridges coherency traffic across multiple networks in accordance with a preferred embodiment of the invention. In FIG. 3, network interface 320 performs the network traffic management required to receive and transmit mass storage and coherency traffic from processing elements such as 130 and 140 of FIG. 1 by way of network 150. Preferably, network interface 320 includes the necessary electronics and devices that permit the use of optical fibers as the transmission media to convey digital information to and from the processing elements. Alternatively, network interface 320 includes the electronics and devices that permit the use of a conductive media to convey digital information to and from the processing elements.

Network interface 320 is coupled to router 330 which determines the destination of mass storage and coherency traffic received from network interface 320. Desirably, mass storage traffic is conveyed directly to storage element access manager 340 for storage by storage elements 100 through link 105.

Storage element controller 110 (of FIG. 3) also includes cache/command coherency traffic manager 350 coupled to router 330. Cache/command coherency traffic manager 350 communicates low-level coherency traffic semaphores and other detailed information which allows an adjacent (and similar) storage element controller to function. Preferably, this communication takes place by way of link 180. The storage element controller of FIG. 3 further includes global coherency traffic manager 360, which functions to receive coherency messages from network interface 320 through router 330 and forwards this coherency traffic to at least one other storage element controller similar to storage element controller 110, such as storage element controller 120 of FIG. 1. Additionally, global coherency traffic manager 360 receives coherency traffic from other, similar storage element controllers, such as storage element controller 120, for transmission through network interface 320 to processing elements interfaced to network interface 320.

It is noteworthy that the elements of FIG. 3 are merely functions that can be performed by a variety of physical implementations. Thus, for example, the functions of cache/command coherency traffic manager 330 and global coherency traffic manager 360 can be performed within a single unit.

A redundant array of data storage elements that bridges coherency traffic across multiple networks provides an improved means of controlling access to the data storage elements in a high availability communications system. This allows the processing elements to perform file operations and manipulate the data stored in a redundant array of data storage elements without requiring a separate communications channel to convey coherency traffic information. The resulting system reduces the required complexity of high availability redundant arrays of data storage elements, and is especially useful when processing elements spread across multiple networks are required to perform file access operations using the data storage elements. The system additionally provides the opportunity for increasing the performance of a redundant array of data storage elements without jeopardizing the fault tolerant aspects of the redundant array.

Accordingly, it is intended by the appended claims to cover all modifications of the invention that fall within the true spirit and scope of the invention.

What is claimed is:

1. A system of redundant array of data storage elements that bridges coherency traffic across multiple networks, comprising:
    a redundant array of data storage elements;
    a plurality of storage element controllers, wherein each of said plurality of storage element controllers is coupled to said redundant array of data storage elements, and wherein each of the plurality of storage element controllers is coupled to each other via a link coupled to convey exclusively the coherency traffic between the plurality of storage element controllers; and
    a plurality of networks coupled to said redundant array of data storage elements, wherein each of said plurality of storage element controllers bridges coherency traffic received from a first of said plurality of networks to a second of said plurality of networks using the link.

2. The system of claim 1, wherein each of said plurality of networks uses at least one optical fiber to convey information.

3. The system of claim 1, wherein each of said plurality of networks uses a conductive media to convey information.

4. The system of claim 1, wherein at least one of said plurality of storage element controllers converts optical signals to electrical impulses for propagation along a conductive media.

5. The system of claim 1, wherein at least one of said plurality of storage element controllers additionally coordinates with at least one other of said plurality of storage element controllers by conveying cache/command coherency traffic.

6. The system of claim 1, wherein said redundant array of data storage elements makes use of computer disks as storage elements.

7. The system of claim 6, wherein said computer disks employ a magnetic material to store information.

8. The system of claim 6, wherein said computer disks employ digital storage media which is read by way of a laser.

9. A storage element controller for use in a redundant array of inexpensive disks comprising:
    a network interface for receiving and transmitting mass storage and global coherency messages along a network;
    a storage element access manager, coupled to said network interface, for transmitting data to and receiving data from a mass storage device; and
    a global coherency traffic manager, coupled to said network interface for conveying said global coherency messages from said network interface to a second storage element controller along a link, and for receiving global coherency messages from said second storage element controller and conveying said global coherency messages from said second storage element controller to said network interface, wherein the link is coupled to convey exclusively the global coherency messages between the storage element controller and the second storage element controller.

10. The storage element controller of claim 9, wherein said network makes use of optical fibers to convey information.

11. The storage element controller of claim 9, wherein said mass storage device makes use of a computer disk which stores information.

12. The storage element controller of claim 11, wherein said computer disk employs a magnetic medium to store information.

13. The storage element controller of claim 11, wherein said computer disks employ digital storage media which is read by way of a laser.

14. In a redundant array of data storage elements, a method for bridging coherency traffic from a first network to a second network, comprising:
    detecting a global coherency message on a first network;
    conveying said global coherency message from a first controller of a redundant array of data storage elements to a second controller of said redundant array of data storage elements using a link coupled to convey exclusively the coherency traffic between the first controller and the second controller; and transmitting said global coherency message along said second network.

15. The method of claim 14, wherein said global coherency message detected on said first network is a request for access to said redundant array of data storage elements.

16. The method of claim 15, wherein the method further comprises waiting to determine if a second request for access to said redundant array of data storage elements is received.

17. The method of claim 16, wherein the method further comprises exchanging arbitration data in order to resolve contention over said access to said redundant array of data storage elements.

18. The method of claim 14, wherein said data storage elements within said redundant array of data storage elements are computer disks.

* * * * *